United States Patent
Cragun et al.

(10) Patent No.: US 8,407,607 B2
(45) Date of Patent: Mar. 26, 2013

(54) DYNAMIC VIRTUAL DASHBOARD

(75) Inventors: Brian J. Cragun, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/388,787

(22) Filed: Feb. 19, 2009

(65) Prior Publication Data

US 2010/0211890 A1    Aug. 19, 2010

(51) Int. Cl.
*G06F 3/048* (2006.01)
*G06F 3/00* (2006.01)
(52) U.S. Cl. ............... 715/757; 715/753; 715/758
(58) Field of Classification Search .......... 715/757, 715/753, 758
See application file for complete search history.

(56) References Cited

U.S. PATENT DOCUMENTS

| | | | | |
|---|---|---|---|---|
| 5,880,731 | A * | 3/1999 | Liles et al. | 715/758 |
| 5,961,646 | A * | 10/1999 | Sokol | 726/15 |
| 7,069,427 | B2 * | 6/2006 | Adler et al. | 713/1 |
| 7,117,254 | B2 * | 10/2006 | Lunt et al. | 709/218 |
| 7,451,190 | B2 * | 11/2008 | Szeto | 709/207 |
| 7,478,129 | B1 * | 1/2009 | Chemtob | 709/204 |
| 7,603,320 | B1 * | 10/2009 | Shu | 705/64 |
| 7,686,219 | B1 * | 3/2010 | Wisilosky et al. | 235/385 |
| 8,006,191 | B1 * | 8/2011 | Anderson | 715/758 |
| 8,307,427 | B1 * | 11/2012 | Wisilosky et al. | 726/22 |
| 2002/0097267 | A1 * | 7/2002 | Dinan et al. | 345/757 |
| 2003/0018613 | A1 * | 1/2003 | Oytac | 707/1 |
| 2004/0047461 | A1 * | 3/2004 | Weisman et al. | 379/202.01 |
| 2004/0117228 | A1 * | 6/2004 | Iino et al. | 705/7 |
| 2004/0117501 | A1 * | 6/2004 | Day et al. | 709/232 |
| 2004/0122803 | A1 * | 6/2004 | Dom et al. | 707/3 |
| 2004/0162904 | A1 * | 8/2004 | Eida et al. | 709/228 |
| 2004/0268270 | A1 * | 12/2004 | Hill et al. | 715/963 |
| 2006/0168051 | A1 * | 7/2006 | Jung et al. | 709/206 |
| 2006/0224611 | A1 * | 10/2006 | Dunn et al. | 707/102 |
| 2007/0149179 | A1 * | 6/2007 | Kashiwabara | 455/415 |
| 2008/0141146 | A1 * | 6/2008 | Jones et al. | 715/753 |
| 2008/0276315 | A1 * | 11/2008 | Shuster | 726/22 |
| 2009/0089685 | A1 * | 4/2009 | Mordecai et al. | 715/757 |
| 2009/0172539 | A1 * | 7/2009 | Bates et al. | 715/706 |
| 2009/0202053 | A1 * | 8/2009 | Zehnbacht et al. | 379/93.12 |
| 2009/0249234 | A1 * | 10/2009 | Zilca et al. | 715/765 |

OTHER PUBLICATIONS

Veer, E. A., Facebook: the Missing Manual, pp. xi, 6-11, 34, and 35 (1st ed. Jan. 2008).*

(Continued)

*Primary Examiner* — Steven Sax
*Assistant Examiner* — Conrad Pack
(74) *Attorney, Agent, or Firm* — Patterson & Sheridan LLP (57) ABSTRACT

Techniques are disclosed for helping users of virtual worlds and social networking applications to control personal identity data that other users have access to and to determine the type of identity data that users know about each other. Generally, identity awareness records may be used to store the personal identity data that a user has revealed to other users. When the user sends information to another user, personal identity data is mapped to appropriate aliases, depending upon which user is receiving the information. When the user is in the presence of other users, a visual dashboard indicates the types of personal identity information that the user knows about each other user, as well as the types of personal identity information that each other user knows about the user. The visual dashboard may also indicate the types of personal identity information that the other users know about each other.

24 Claims, 10 Drawing Sheets

OTHER PUBLICATIONS

Veer, E. A., Facebook: the Missing Manual, pp. ii, 6-11, 34, 35, 49-53, and 222-228 (1st ed. Jan. 2008).*

Lange, P.G. (2007), "Publicly Private and Privately Public: Social Networking on YouTube", Journal of Computer-Mediated Communication, 13(1), article 18, printed from http://jcmc.indiana.edu/vol13/issue1/lange.html.

Michael Arrington, "Google Gathers Social Graph Information From the Web, Launches API", Feb. 1, 2008; printed from http://techcrunch.com/2008/02/01/googles-gathers-social-graph-information-from-the-web-launches-api.

Net Nanny Parental Controls and Internet Filtering from ContentWatch, printed from web archive date Aug. 22, 2008 at http://classic-web.archive.org/web/20080731221750\www.netnanny.com.

Net Nanny Internet Filter, Parental Controls & Filters Software, printed from http://www.netnanny.com/alt_fr on Apr. 21, 2011.

"Auto-text", From Wikipedia, the free encyclopedia, printed from http://en.wikipedia.org/wiki/Auto-text, on Apr. 21, 2011.

"Dashboard" definition, printed from web archive page dated Jun. 24, 2008, http://classic-web.archive.org/web/20080624150530/http://www.csgnetwork.com/glossaryd.html#dashboard.

* cited by examiner

DYNAMIC VIRTUAL DASHBOARD

BACKGROUND OF THE INVENTION

1. Field of the Invention

Embodiments of the invention relate to helping individuals manage their personal identity data. More specifically, embodiments of the invention allow users of virtual worlds and social networking applications to control personal identity data to which other users have access using a dynamic virtual dashboard.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another. Users typically communicate with one another through their avatars using text messages sent between avatars, real-time voice communication, gestures displayed by avatars, symbols visible in the virtual world, and the like.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or other multi-user environments, the virtual world continues to exist, and plot and events continue to occur as users enter (and exit). Similar to virtual worlds, social networking websites allow users to communicate with each other. Typically, this is done through text messages, emails, and the like.

Users interacting with one another in virtual worlds and social networking applications often share personal information with each other. However, a given user typically tends to reveal more personal information to a close friend than to a stranger or casual acquaintance. For example, in a given setting of a virtual world, if the only other user present is a close friend, then the user may reveal a new home address. However, the user may not reveal the new home address if there are unfamiliar users present.

SUMMARY OF THE INVENTION

One embodiment of the invention includes a computer-implemented method for presenting identity data to users interacting with one another in a virtual environment. The method may generally include receiving a request from a first user to display (i) identifying information associated with a second user and (ii) identifying information associated with the first user. The method may also include determining what elements of a first set of identity data, associated with the first user, have been previously revealed to the second user and determining what elements of a second set of identity data, associated with the second user, have been previously revealed to the first user. The method may also include presenting, to the first user, a visual display of the determined elements from the first set of identity data and the determined elements from the second set of identity data.

Still another embodiment of the invention includes a computer-readable storage medium containing a program which, when executed, performs an operation for presenting identity data to a first user. The operation may generally include receiving a request from a first user to display (i) identifying information associated with a second user and (ii) identifying information associated with a first user. The operation may further include determining what elements of a first set of identity data, associated with the first user, have been previously revealed to the second user and determining what elements of a second set of identity data, associated with the second user, have been previously revealed to the first user. The operation may further include presenting, to the first user, a visual display of the determined elements from the first set of identity data and the determined elements from the second set of identity data.

Still another embodiment of the invention includes a system having a processor and a memory containing a program, which, when executed by the processor, performs an operation for presenting identity data to users interacting with one another in a virtual environment. The operation may generally include receiving a request from a first user to display (i) identifying information associated with a second user and (ii) identifying information associated with a first user. The operation may further include determining what elements of a first set of identity data, associated with the first user, have been previously revealed to the second user and determining what elements of a second set of identity data, associated with the second user, have been previously revealed to the first user. The operation may further include presenting, to the first user, a visual display of the determined elements from the first set of identity data and the determined elements from the second set of identity data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Virtual worlds and social networking applications have become a popular way for people to communicate and interact with each other. Just as in everyday communication, users may limit the amount of personal information that they reveal to others, particularly other users with whom they are not familiar. There may be several reasons for this, such as the rise in identity theft, safety concerns, or simply a desire to maintain privacy.

When communicating in a virtual world and social networking application, a user runs the risk of unintentionally revealing private information about himself or his friends to the wrong people. For example, when User X and User Y are in a group setting, some members of the group may not know the real name of User X. User Y may not realize this, and therefore User Y may refer to User X by using her real name. However, User X may not want other users to know her real name. Similarly, User X and user Y may not know personal identity information about other members of the group. Thus, other users may wish to limit the amount of personal identity data that they reveal to User X and User Y. Furthermore, in a virtual world setting, User X may wish to alter the appearance of her avatar, depending upon which user she is interacting with. Thus, users may wish to alter or restrict what personal identity data is communicated to other users, whether in the form of text, images, or sound.

Embodiments of the invention provide techniques allowing users of virtual worlds and social networking applications to control what personal identity data other users have access to and to determine the type of identity data that users know about each other. Generally, identity awareness records may be used to store the personal identity data that a user has revealed to other users. When the user sends information to another user, personal identity data is mapped to appropriate aliases, depending upon which user is receiving the information. When the user is in the presence of other users, a visual dashboard indicates the types of personal identity information that the user knows about each other user, as well as the types of personal identity information that each other user knows about the user. The visual dashboard may also indicate the types of personal identity information that the other users know about each other.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
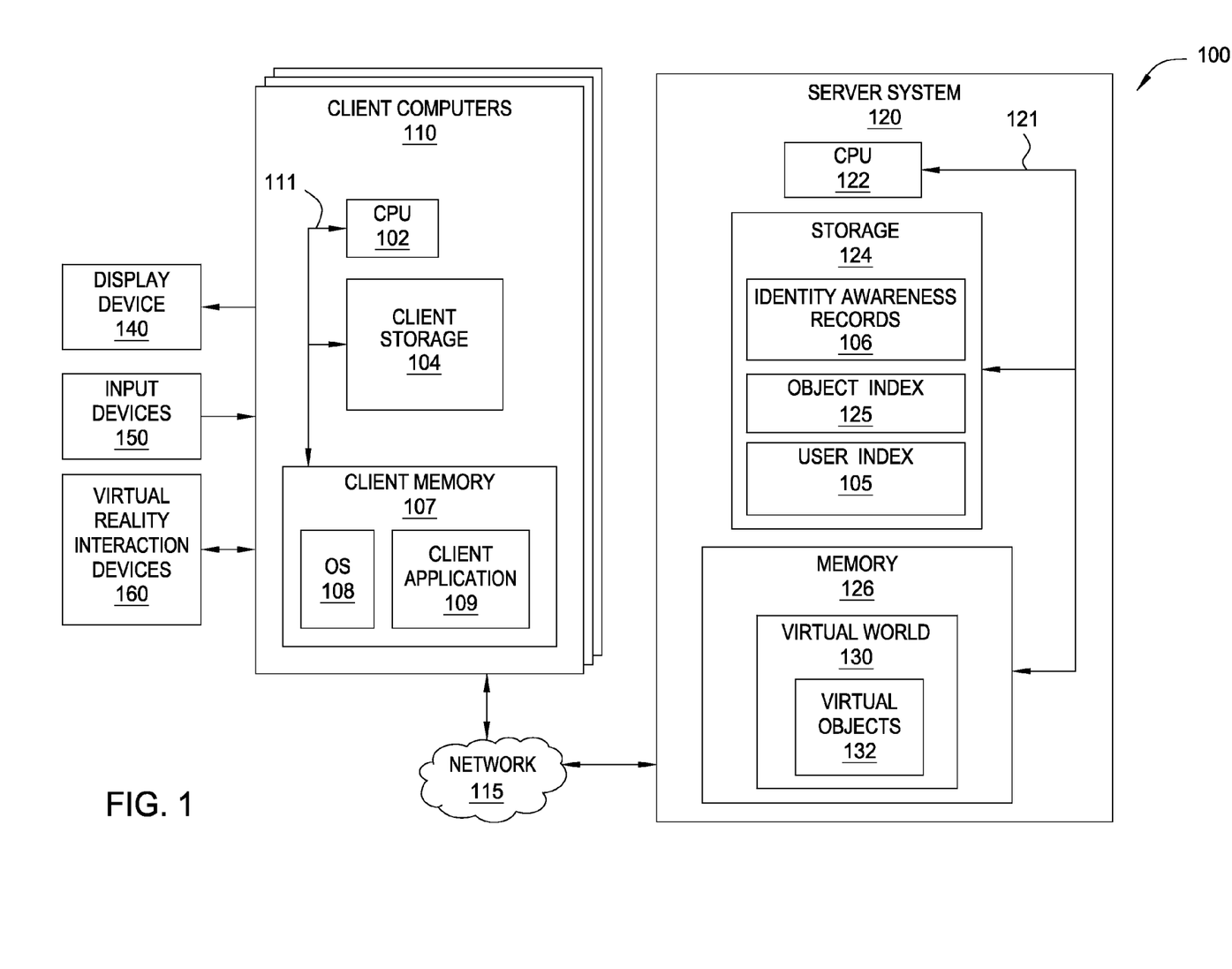
FIG. 1 is a block diagram that illustrates a client server view of a computing environment configured for displaying and obtaining identity data, according to one embodiment of the invention.

FIG. 1 is a block diagram that illustrates a client server view of a computing environment 100 configured for displaying and obtaining identity data, according to one embodiment of the invention. As shown, computing environment 100 includes client computers 110, network 115, and server system 120. In one embodiment, the computer systems illustrated in FIG. 1 are included to be representative of existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

Also as shown, memory 126 includes virtual world 130. In one embodiment, virtual world 130 may be a software application that accepts connections from multiple clients, allowing users to explore and interact with an immersive virtual environment by controlling the actions of an avatar. Illustratively, virtual world 130 includes virtual objects 132. Virtual objects 132 represent the content present within the environment provided by virtual world 130, including both elements of the "world" itself as well as elements controlled by a given user. Illustratively, storage 124 includes an object index 125, a user index 105, and identity awareness records 106. In one embodiment, the object index 125 may store data describing characteristics of virtual objects 132 included in virtual world 130, and may be accessed to perform searches of virtual objects 132. The use of object index 125 in performing searches is discussed below with reference to client application 109.

Like server system 120, each client computer 110 includes a CPU 102, bus 111, client memory 107, and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 stores elements of an operating system (OS) 108 and a client application 109. Operating system 108 is the software used for managing the operation of the client computer 110. Examples of an operating system 108 include UNIX, a version of the Microsoft Windows® operating system, and distributions of the Linux® operating system. (Note, Linux is a trademark of Linus Torvalds in the United States and other countries.)

In one embodiment, client application 109 provides a software program that allows a user to connect to a virtual world 130, and once connected, to explore and interact with virtual world 130 and other users. Further, client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to virtual world 130 on server 120. Such a display may include content from the virtual world determined from the user's line of sight at any given time. For the user, the display may include the avatar of that user or may be a camera eye where the user sees the virtual world through the eyes of the avatar representing this user.

Figure 2:
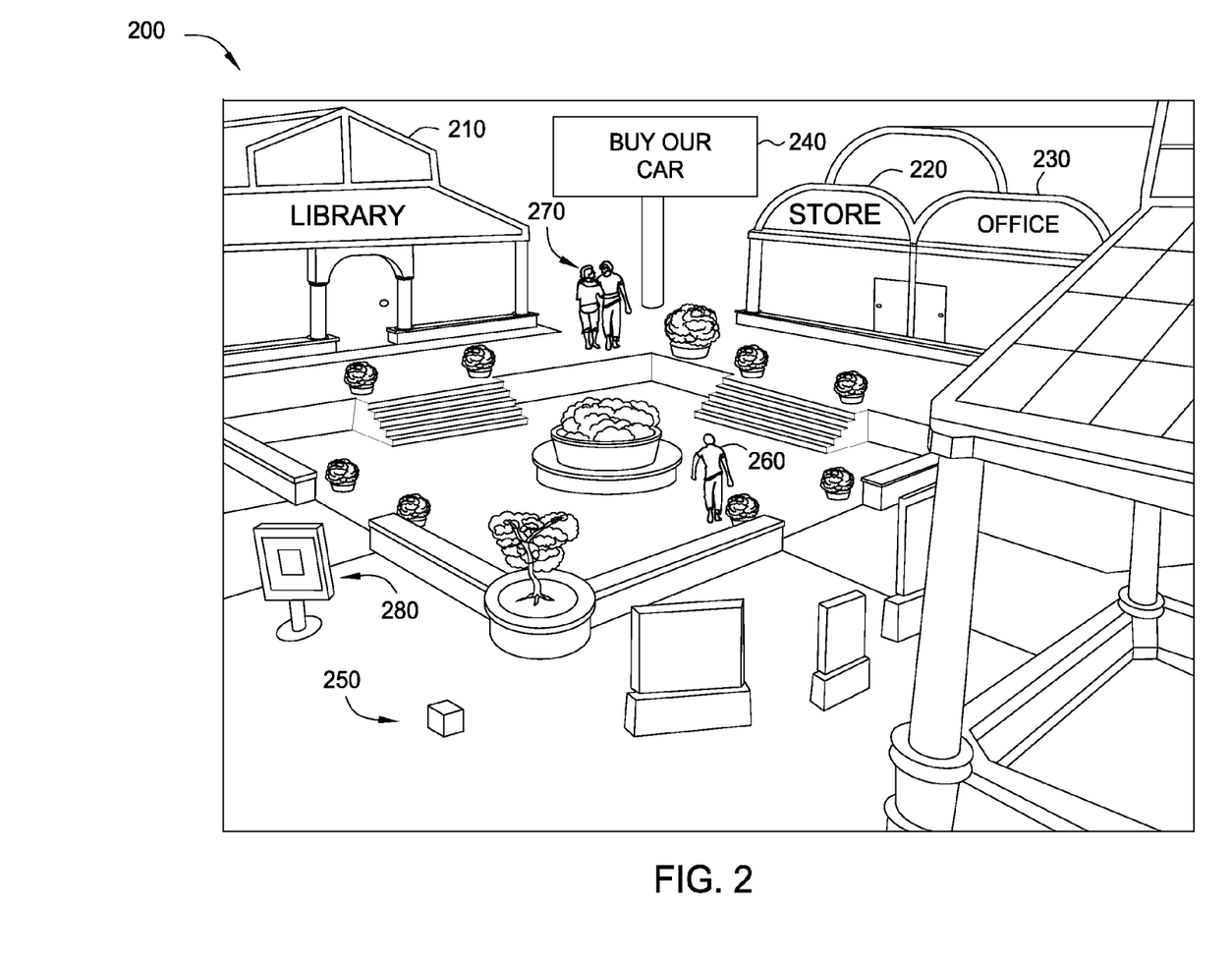
FIG. 2 illustrates an example display of a user participating in a virtual world, according to one embodiment of the invention.

For instance, using the example illustrated in FIG. 2, virtual objects 132 may include box 250, store 220, library 210, etc. More specifically, FIG. 2 illustrates an example display 200 of a user participating in a virtual world, according to one embodiment of the invention. In this example, one user is represented by avatar 260, and two other users are represented by avatars 270. The user may interact with elements displayed in user display 200. For example, the user may interact with a box 250 by picking it up, opening it, etc. The user may also interact with a kiosk 280 by operating controls built into the kiosk 280, requesting information, etc. The user may also interact with a billboard 240 by looking at it or pointing to it (i.e., by positioning the line of sight directly towards the billboard 240 and extending the arm towards it). Additionally, a user may interact with larger elements of the virtual world. For example, the user may be able to enter a store 220, an office 230, or a library 210. As used herein, the term "virtual objects" refers broadly to such elements of a virtual world (e.g., box 250, store 220, etc.).

The user may view the virtual world using a display device 140, such as an LCD or CRT monitor display, and interact with the client application 109 using input devices 150 (e.g., a keyboard and a mouse). Further, in one embodiment, the user may interact with client application 109 and virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 130.

Within virtual world 130, avatars can interact with other avatars. For example, a user with avatar A could click on an avatar B to start an instant message conversation with the user associated with avatar B. In one embodiment, client application 109 may allow users to control what personal identity data other users have access to. For example, if a user selects "painter_dude" as his user name, then "painter_dude" will be displayed as his name for other users. However, if the user decides to reveal his true first name (for example, "Brian") to User X, then client application 109 may store an entry in the identity awareness records 106 that reflects the fact that Brian revealed his first name to User X. From then on, "Brian" may be displayed to User X, instead of "painter_dude."

Figure 5:
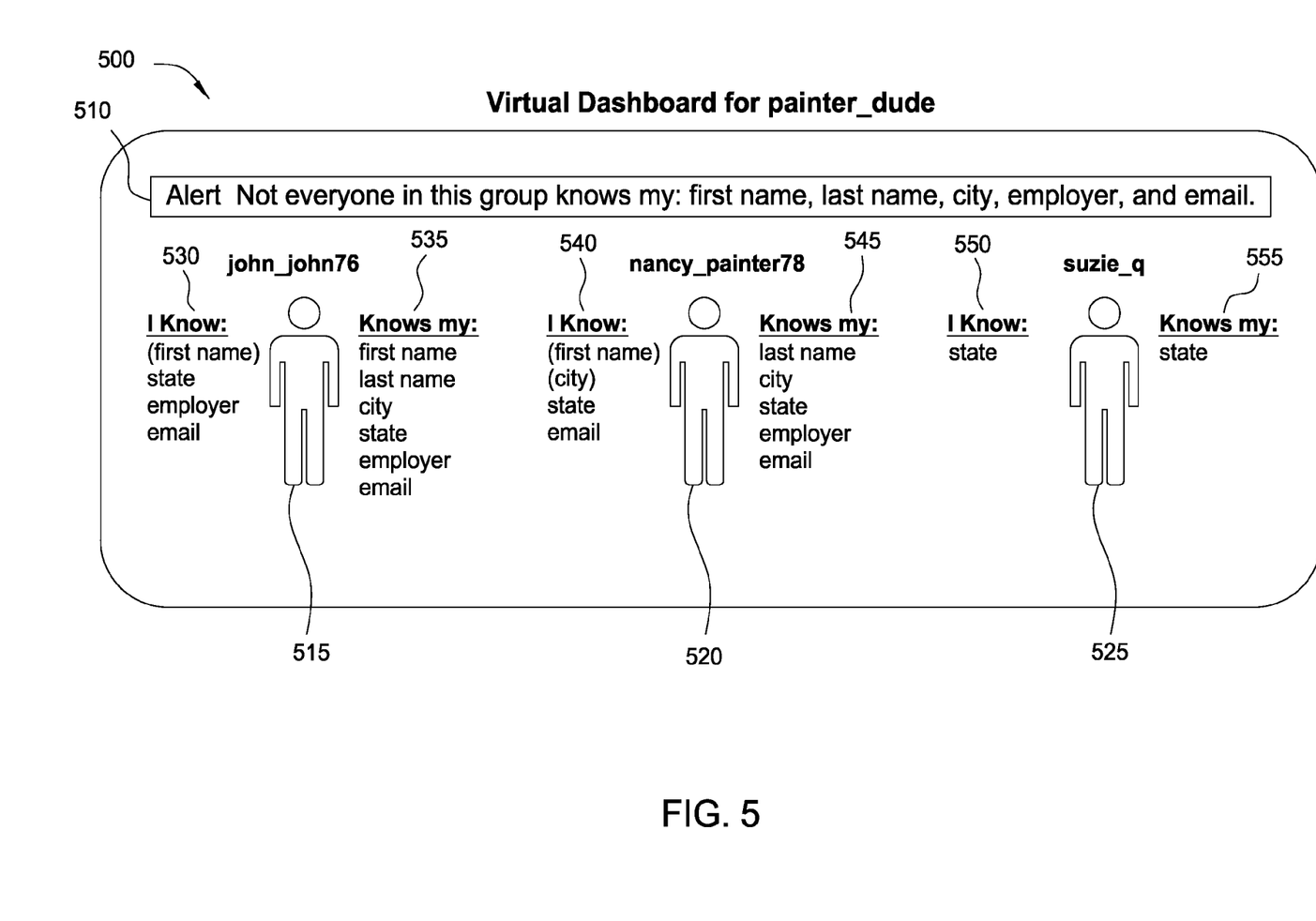
FIG. 5 illustrates an example display for obtaining identity awareness information between a first user and three users in the presence of the first user, according to one embodiment of the invention.
Figure 6:
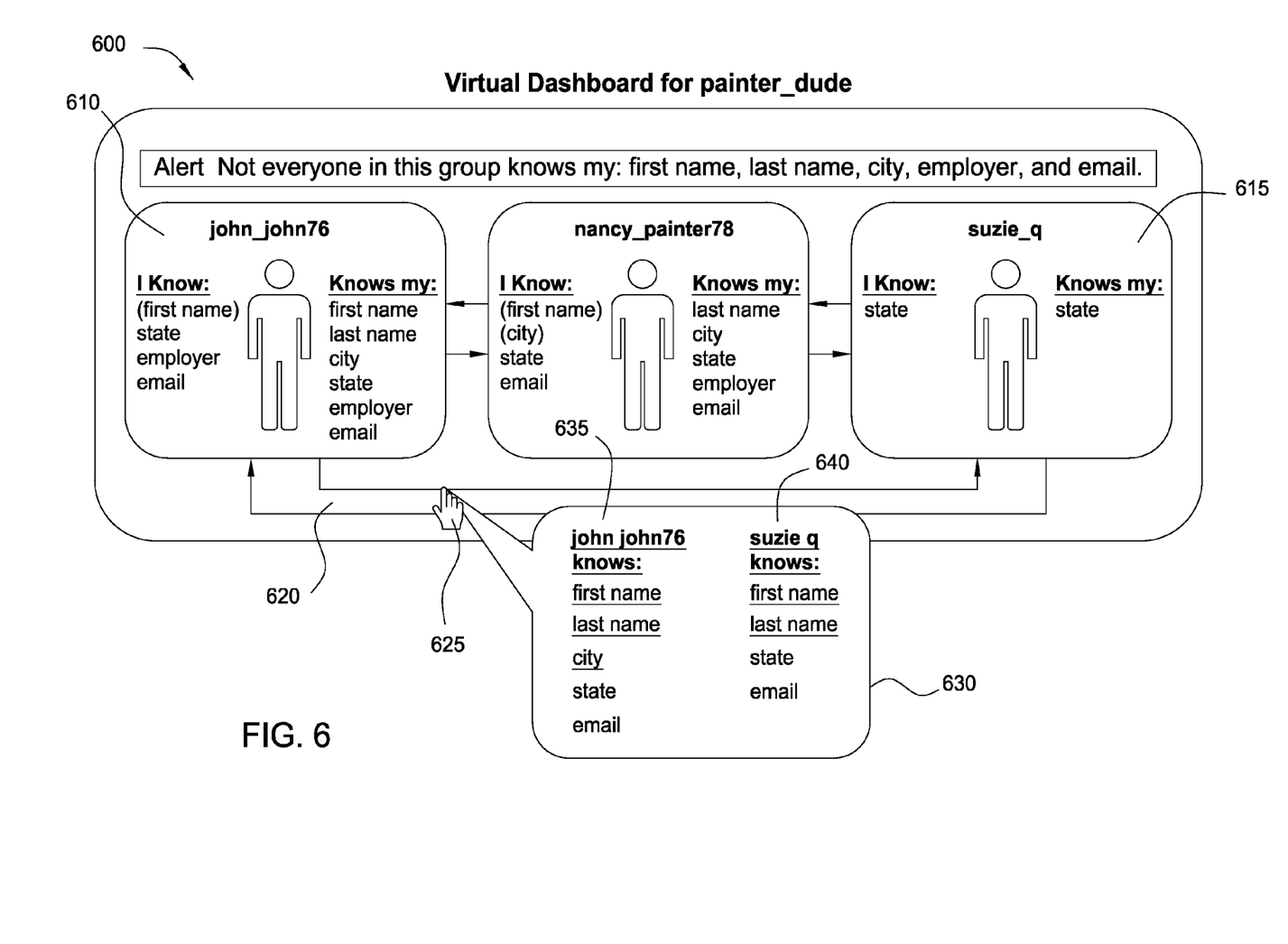
FIG. 6 illustrates an example display for obtaining identity awareness information between two users in the presence of a third user, according to one embodiment of the invention.

Further, when a user is in the presence of other users, client application 109 may display a dashboard that indicates the types of personal identity information (if any) that the user knows about each other user, as well as the types of personal identity information that each other user knows about the user. The dashboard may also indicate what personal identity information that the other users know about each other. Of course, one of ordinary skill in the art will recognize that, a dashboard may have many configurations in addition to the Examples provided herein and such configurations may disperse data throughout different areas of a screen display. Examples of a dashboard are shown in FIGS. 4-6, described below.

Of course, the embodiments described above are intended to be illustrative, and are not limiting of the invention. For example, the identity management functionality of client application 109 may be incorporated into a server-side application, such as an application hosting the virtual world 130, or in a separate application (e.g., a web browser). In yet another example, object index 125 and the user index 105 may be combined in a single data structure. Furthermore, one of ordinary skill in the art will recognize that the identity management functionality of client application 109 may be incorporated into a social networking application (or other applications) that involve the sharing of personal identity information between users.

Figure 3:
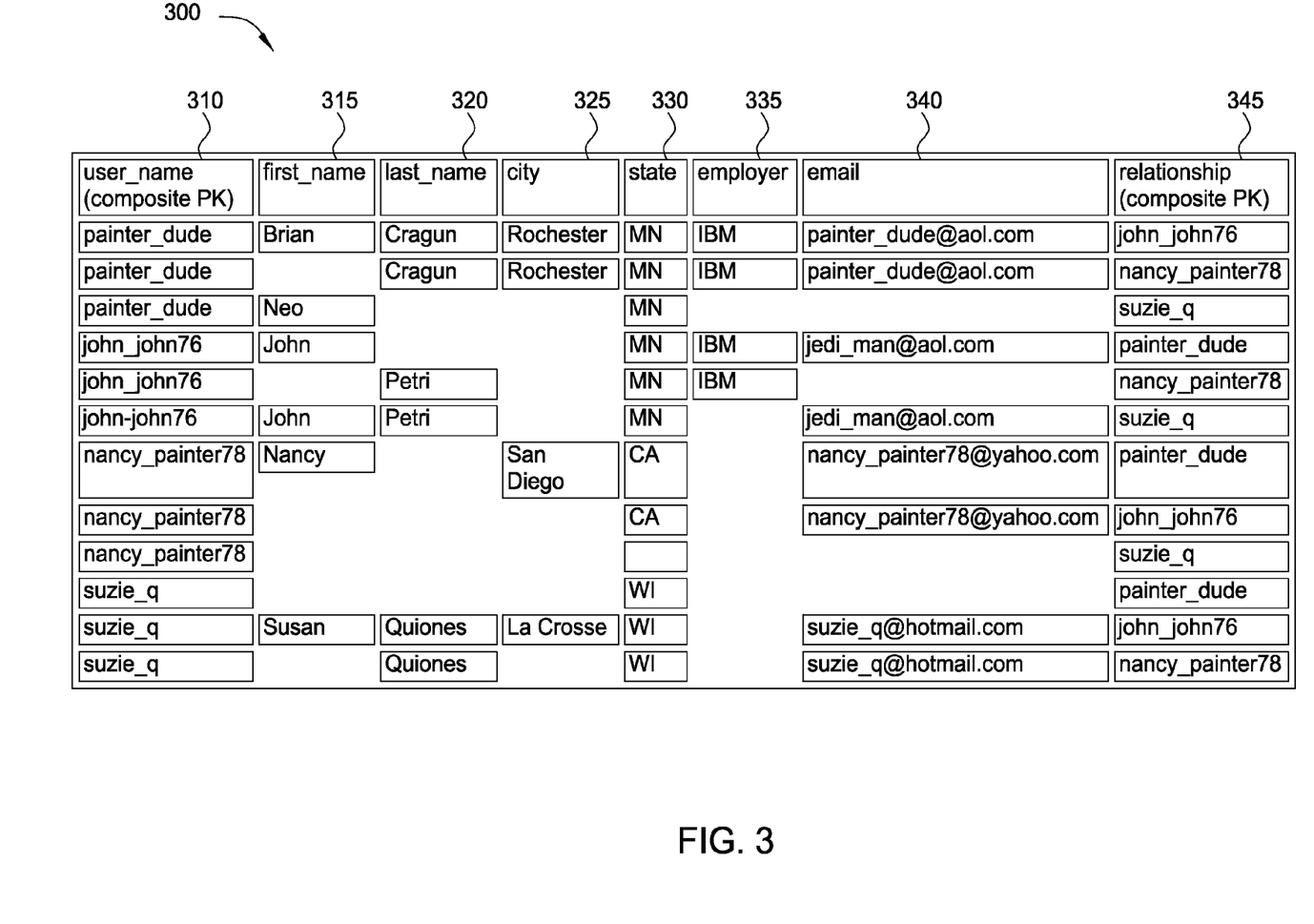
FIG. 3 illustrates a table which provides an example of a set of identity awareness records 106, according to one embodiment of the invention.

FIG. 3 illustrates a table 300 which provides an example of a set of identity awareness records 106, according to one embodiment of the invention. As shown, the identity awareness records 106 in table 300 include a field 310 for a user's user name, a field 315 for the user's first name, a field 320 for the user's last name, a field 325 for city, a field 330 for state, a field 335 for the user's employer, a field 340 for the user's email, and a field 345 for another user's user name. A unique primary key may be formed by combining the user name field 310 with the relationship field 345. For each row in table 300, if a value exists in any of the fields 315-340, then the user in field 345 knows that value. For example, the second row in the table shows that Nancy knows Brian's last name, city, state, employer, and email, but not his first name. As another example, the fourth row from the bottom of table 300 shows that Suzie does not know any of Nancy's personal identity data, because there are no values for fields 315-340. Of course, one of ordinary skill in the art will recognize that other personal identity data may be stored, such as eye color, occupation, interests, and the like.

Figure 4:
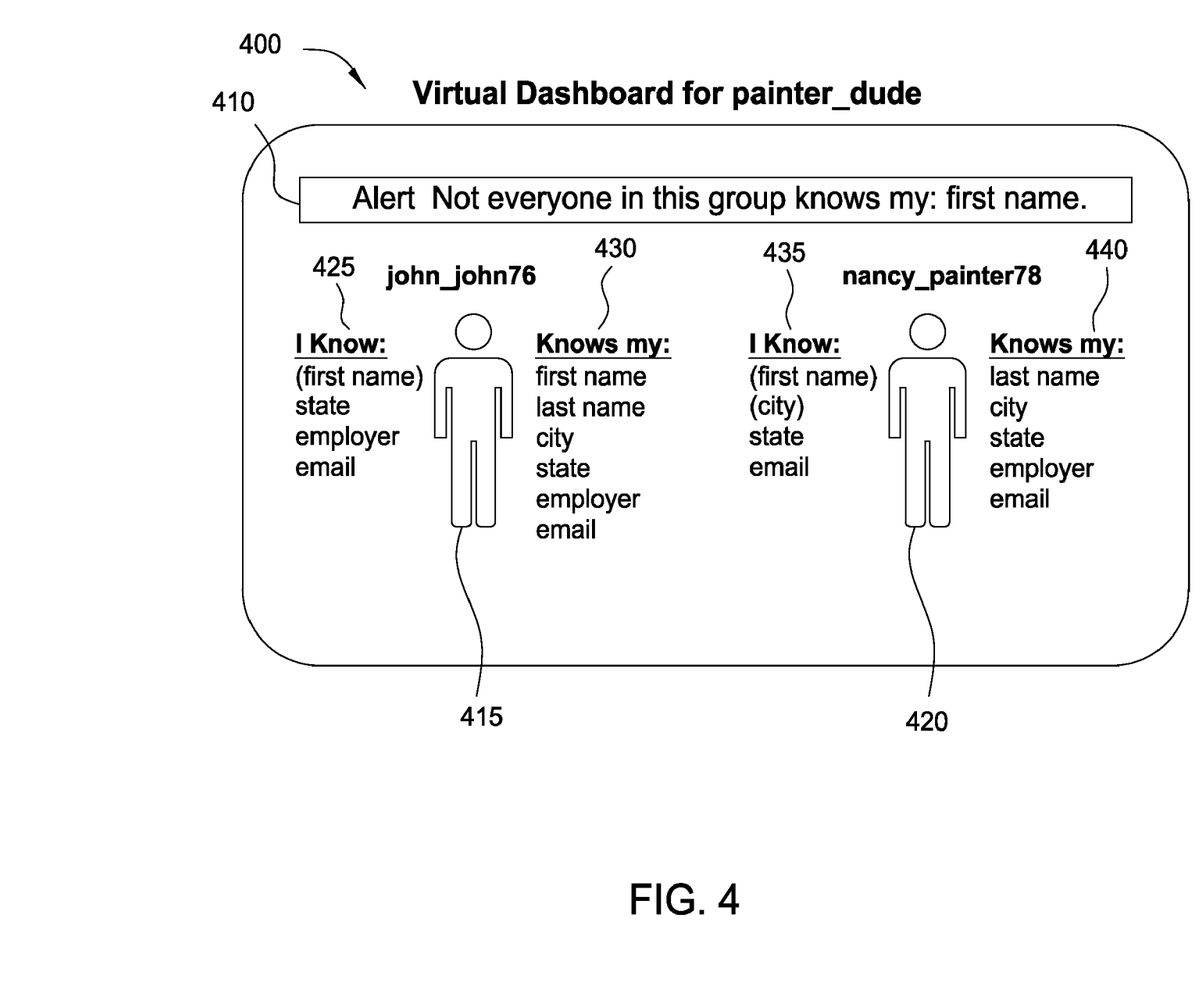
FIG. 4 illustrates an example display for obtaining identity awareness information between a first user and two users in the presence of the first user, according to one embodiment of the invention.

FIG. 4 illustrates an example display 400 (also referred to as a virtual dashboard) presenting identity awareness information regarding a first user and two users in the presence of the first user, according to one embodiment of the invention. As shown, when painter_dude (Brian) requests identity awareness information, the display 400 (referred to as a "virtual dashboard") has an area displaying data 415 for "john_john76" (John) and another area displaying data 420 for "nancy_painter78" (Nancy). Columns 425 and 435 indicate the type of personal identity data that Brian knows about John and Nancy. For example, Brian knows John's first name, state, employer, and email. "First name" is highlighted with parenthesis because Nancy does not know John's first name. Of course, other methods of highlighting may be used, such as brackets, underlining, boldface, etc. Similarly, in this example, "first name" and "city" are highlighted for Nancy, because John does not know Nancy's first name and city. Brian may decide to not call Nancy or John by their first names, since they do not know each other's first names. Further, Brian may decide to refer to the state that Nancy or John resides in, since they know each other's state. In one embodiment, if Brian attempts to communicate by calling Nancy or John by their first name, client application 109 may automatically substitute an alias for their first name. For example, a policy (or preference) may prevent Brian from revealing Nancy's first name to third parties. Another policy may prevent Brian from revealing Nancy's last name to third parties.

Columns 430 and 440 indicate the type of personal identity data that John and Nancy know about Brian. For example, John knows Brian's first name, last name, city, state, employer, and email. This provides Brian an indication or a reminder of how well John knows Brian. Finally, an alert 410 indicates if any of Brian's personal identity data is not known to everyone in the group. Here, since Nancy does not know Brian's first name, the alert indicates that not everyone in the group knows Brian's first name. The alert may be useful in guiding Brian's communications, since he may not want to reveal his first name to Nancy.

FIG. 5 illustrates an example display 500 (also referred to as a virtual dashboard) presenting identity awareness information regarding a first user and three users in the presence of the first user, according to one embodiment of the invention. As shown, when painter_dude (Brian) requests identity awareness information, the display 500 has an area displaying data 515 for "john_john76" (John), another area displaying data 520 for "nancy_painter78" (Nancy), and another area displaying data 525 for "suzie_q" (Suzie). Similar to display 400, columns 530, 540, and 550 indicate the type of personal identity data that Brian knows about John, Nancy, and Suzie. As in display 400, "first name" and "city" are highlighted for Nancy, because not everyone in the group knows Nancy's first name and city. Brian may decide not to refer to Nancy or Brian by their first names, since not everyone in the group knows their first names. In one embodiment, even if Brian attempts to communicate by calling Nancy or John by their first name, client application 109 may automatically substitute an alias for their first name.

Similar to display 400, columns 535, 545, and 555 indicate the type of personal identity data that John, Nancy, and Suzie know about Brian. This provides Brian an indication of how well the users know Brian. Finally, an alert 510 indicates if any of Brian's personal identity data is not known to everyone in the group. Here, the alert indicates that not everyone knows Brian's first name, last name, city, employer, and email. The alert may be useful in guiding Brian's communications, since he may not want to reveal the above information to everyone in the group.

FIG. 6 illustrates an example display 600 presenting identity awareness information regarding two users in the presence of a third user, according to one embodiment of the invention. As shown, display 600 is similar to display 500, except there is a graphical link 620 between John 610 and Suzie 615. In one embodiment, the link may be created by selecting John 610 and Suzie 615 with a pointer 625. As shown, selecting John 610 and Suzie 615 creates a pop-up display 630 that shows a list 635 of the types of personal identity data that John knows about Susie and a list 640 of the types of personal identity data that Susie knows about John. Thus, the pop-up display 630 allows Brian to determine how well users know each other.

Figure 7:
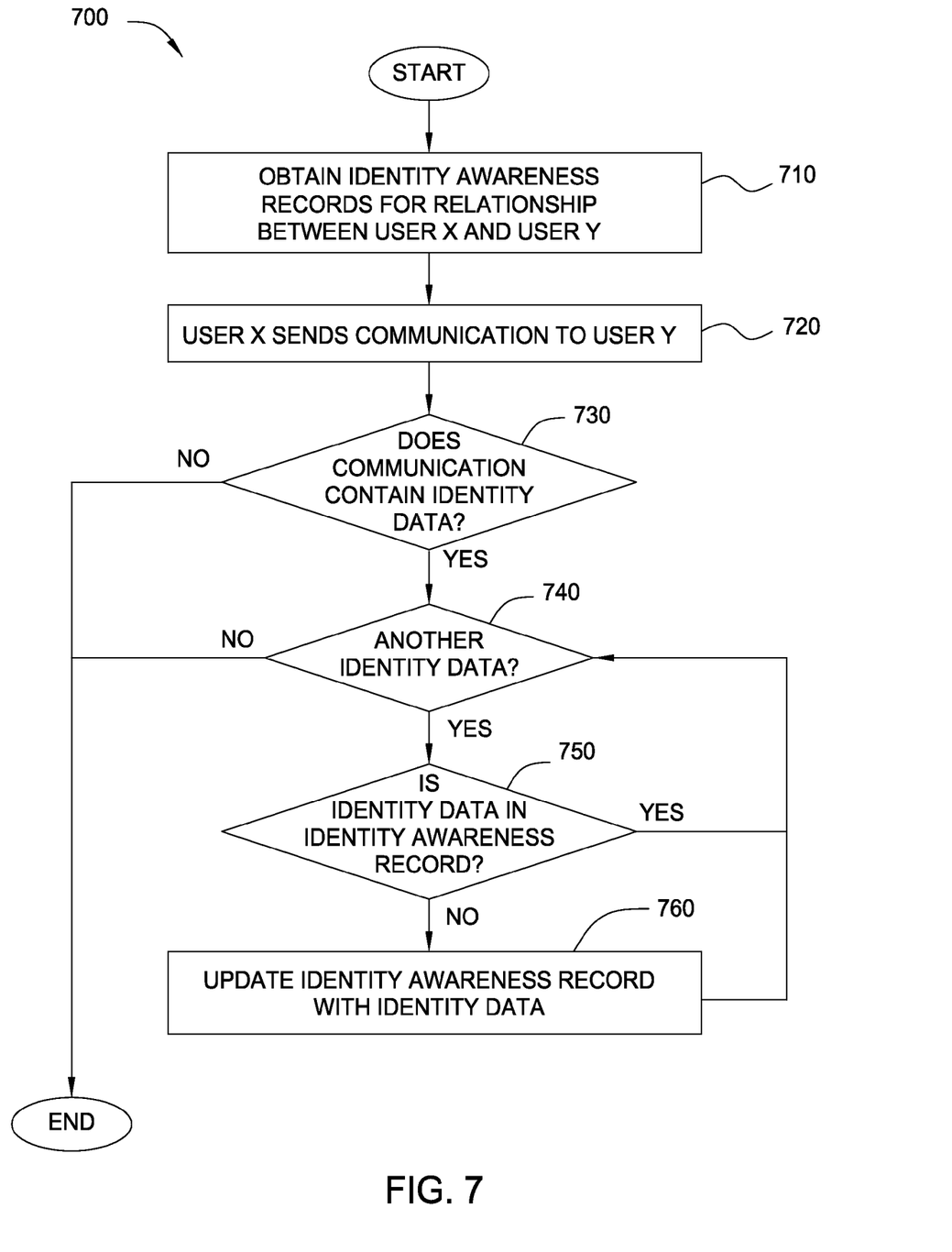
FIG. 7 is a flow diagram illustrating a method for updating an identity awareness record, according to one embodiment of the invention.

FIG. 7 is a flow diagram illustrating a method 700 for updating an identity awareness record, according to one embodiment of the invention. As shown, the method 700 begins at step 710, where client application 109 obtains an identity awareness record. As described above, the identity awareness record may store the identity data that User Y knows about User X. At step 720, User X sends text or other data to User Y. At step 730, client application 109 determines whether the communication contains any identity data of User X. If not, then the method 700 terminates. However, if the communication does contain identity data of User X, then a loop consisting of steps 740-760 begins in which each identity data in the communication is evaluated. At step 740, client application 109 determines whether there is another identity data in the communication to be evaluated. If not, then the method 700 terminates. However, if there is more identity data to evaluate, then at step 750, client application 109 determines whether the identity data already exists in the identity awareness record. If so, then the method 700 returns to step 740. However, if the identity data in the communication does not exist in the identity awareness record, then at step 760, client application 760 updates the identity awareness record with the identity data that User X revealed to User Y. For example, if the first name of User X is "John," and he referred to himself as "John" in a communication with a User Y, "Brian," then the name, "John," is stored into the identity awareness record in the "first name" field of user Brian's knowledge of John. Thus, the next time John encounters Brian, John may be reminded that Brian knows his first name. The method then returns to step 740.

Figure 8:
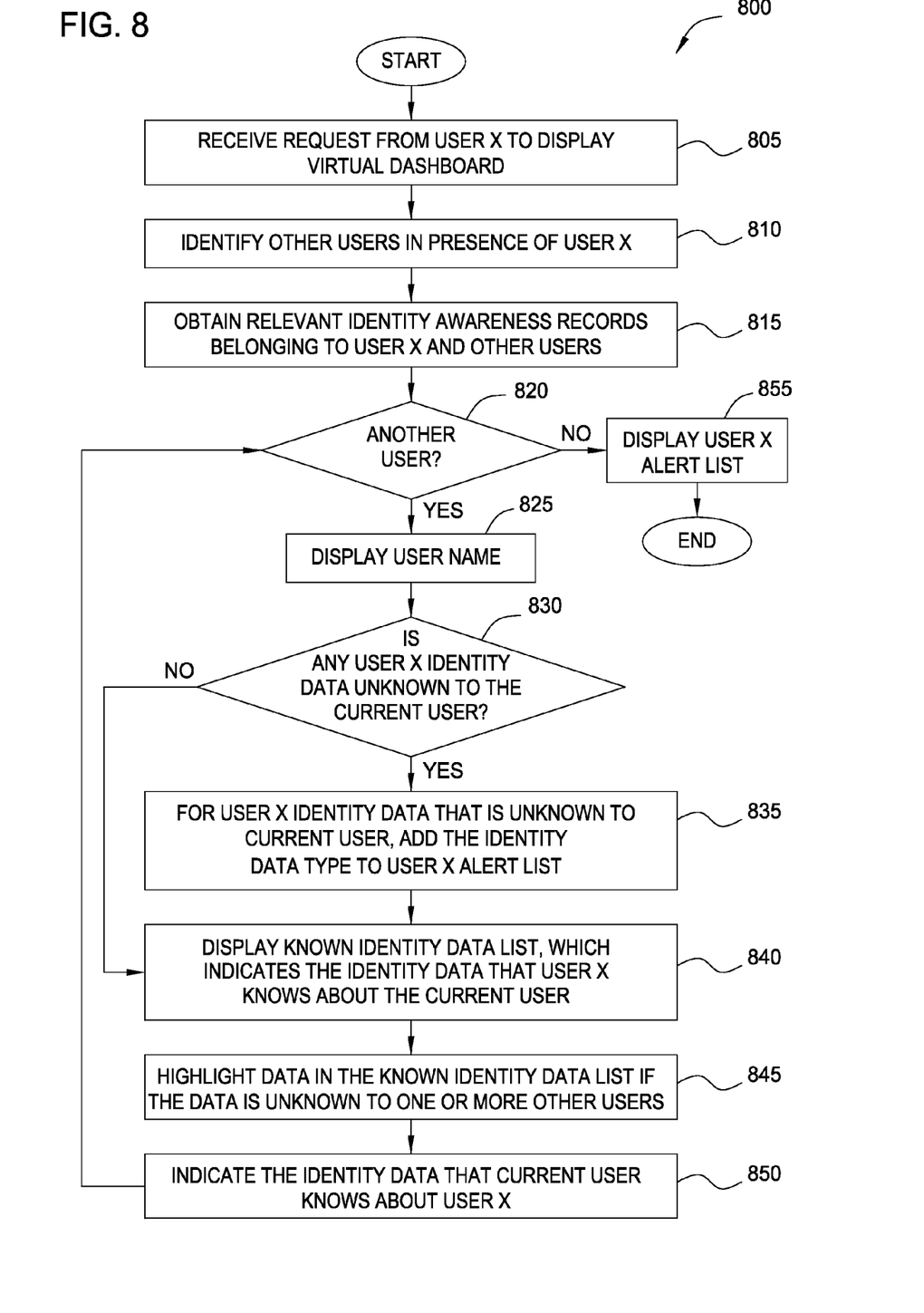
FIG. 8 is a flow diagram illustrating a method for displaying identity awareness information between a first user and users in the presence of the first user, according to one embodiment of the invention.

FIG. 8 is a flow diagram illustrating a method 800 for displaying identity awareness information between a first user and users in the presence of the first user, according to one embodiment of the invention. The method 800 corresponds to FIGS. 4 and 5. As shown, the method 800 begins at step 805, where client application 109 receives a request from User X to display a virtual dashboard. At step 810, client application 109 identifies other users in the presence of User X. At step 815, client application 109 obtains relevant identity awareness records 106 belonging to User X and the other users in the presence of User X. In one embodiment, relevant identity awareness records 106 are obtained by combining two different user names to form a primary key (see table 300 of FIG. 3). A loop consisting of steps 820-850 then begins, where each user identified in step 810 is processed.

At step 820, client application 109 determines if there is another user to be processed. If so, then at step 825, the current user name is displayed. At step 830, client application 109 determines if the current user (the one being evaluated in the loop of block 820) is unaware of any identity data belonging to User X. If not, the method proceeds to step 840. However, if the current user is unaware of any identity data belonging to User X, then at step 835 client application 109 may add to an "alert" list the types of identity data of User X that the current user is unaware of. For example, if the current user does not know that the first name of User X is "John," then "first name" will be added to the alert list for User X.

At step 840, client application 109 displays a "known identity list." The known identity list may provide a list of the types of identity data that User X knows about the user being processed in the current iteration of the loop. At step 845, client application 109 highlights any type of identity data in the known identity list that is unknown to one or more of the other users in the presence of User X. For example, in FIG. 4, nancy_painter78 does not know the first name of john_john76, so "first name" is highlighted (bracketed, underlined, etc.) in the list 425. At step 850, client application 109 displays a list of identity data of User X that the current user knows (i.e., what the current user knows about User X). The method 800 then returns to step 820. At step 820, if there are no more users to process, the "alert" list generated at step 835 is displayed. The method 800 then terminates.

Figure 9:
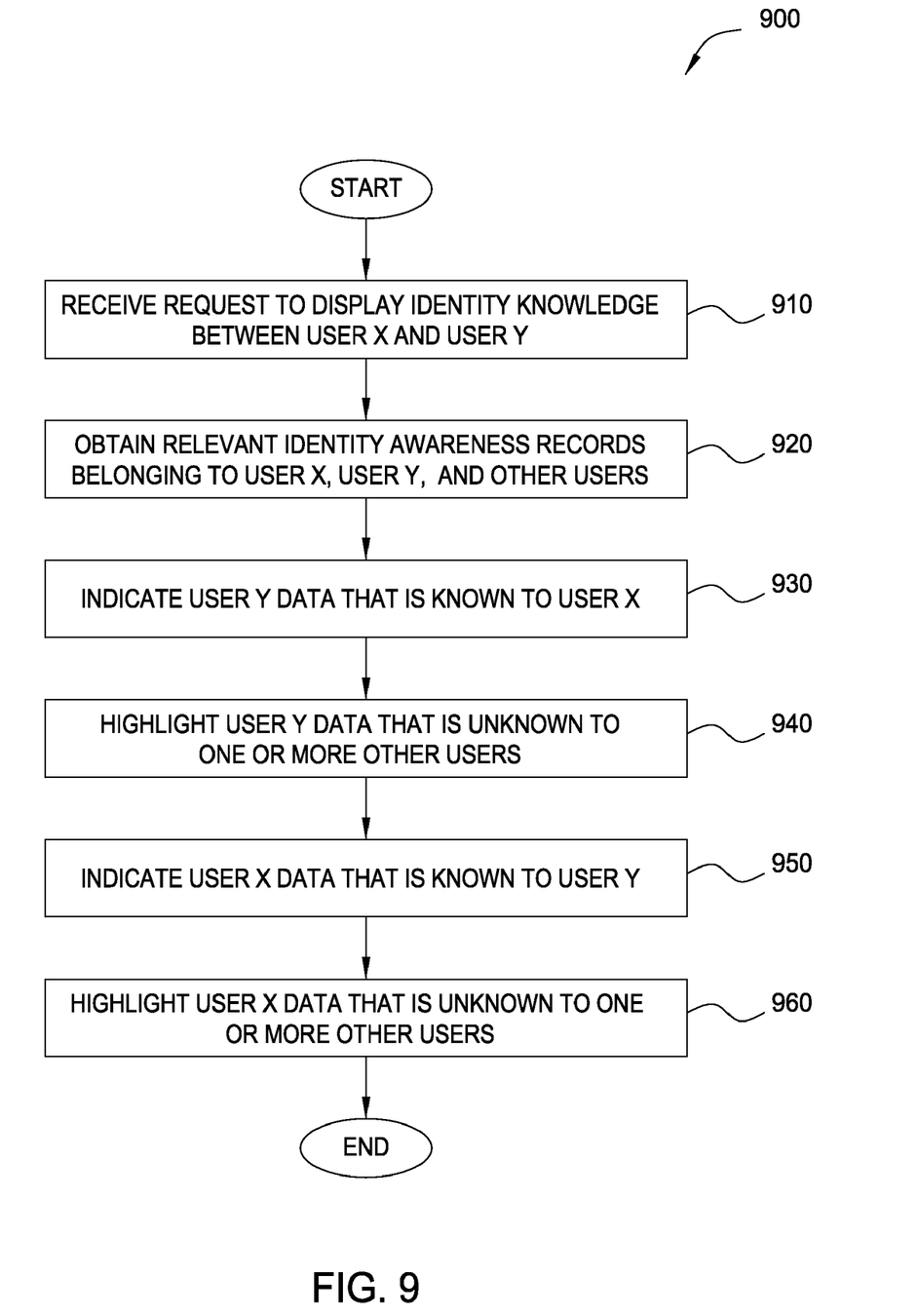
FIG. 9 is a flow diagram illustrating a method for displaying identity awareness information between two users in the presence of a third user, according to one embodiment of the invention.

FIG. 9 is a flow diagram illustrating a method 900 for displaying identity awareness information between two users in the presence of a third user, according to one embodiment of the invention. Method 900 may be used to generate a "virtual dashboard" like the one shown in FIG. 6. As shown, the method 900 begins at step 910, where the client application 109 receives a request to display the types of User X identity data that User Y is aware of and the types of User Y identity data that User X is aware of. At step 920, client application 109 obtains the relevant identity awareness records 106 belonging to User X, User Y, and other users in the presence of User X and User Y. At step 930, client application 109 displays a list of the types of User Y identity data that User X is aware of. At step 940, client application 109 highlights types of identity data in the list that are unknown to one or more other users. For example, in FIG. 6, the pop-up window 630 shows "first name," "last name," and "city" highlighted in the list 635 for john_john76. At step 950, client application 109 displays a list of the types of User X identity data that User Y is aware of. At step 940, client application 109 highlights types of identity data in the list that are unknown to one or more other users. The method 900 then terminates.

Figure 10:
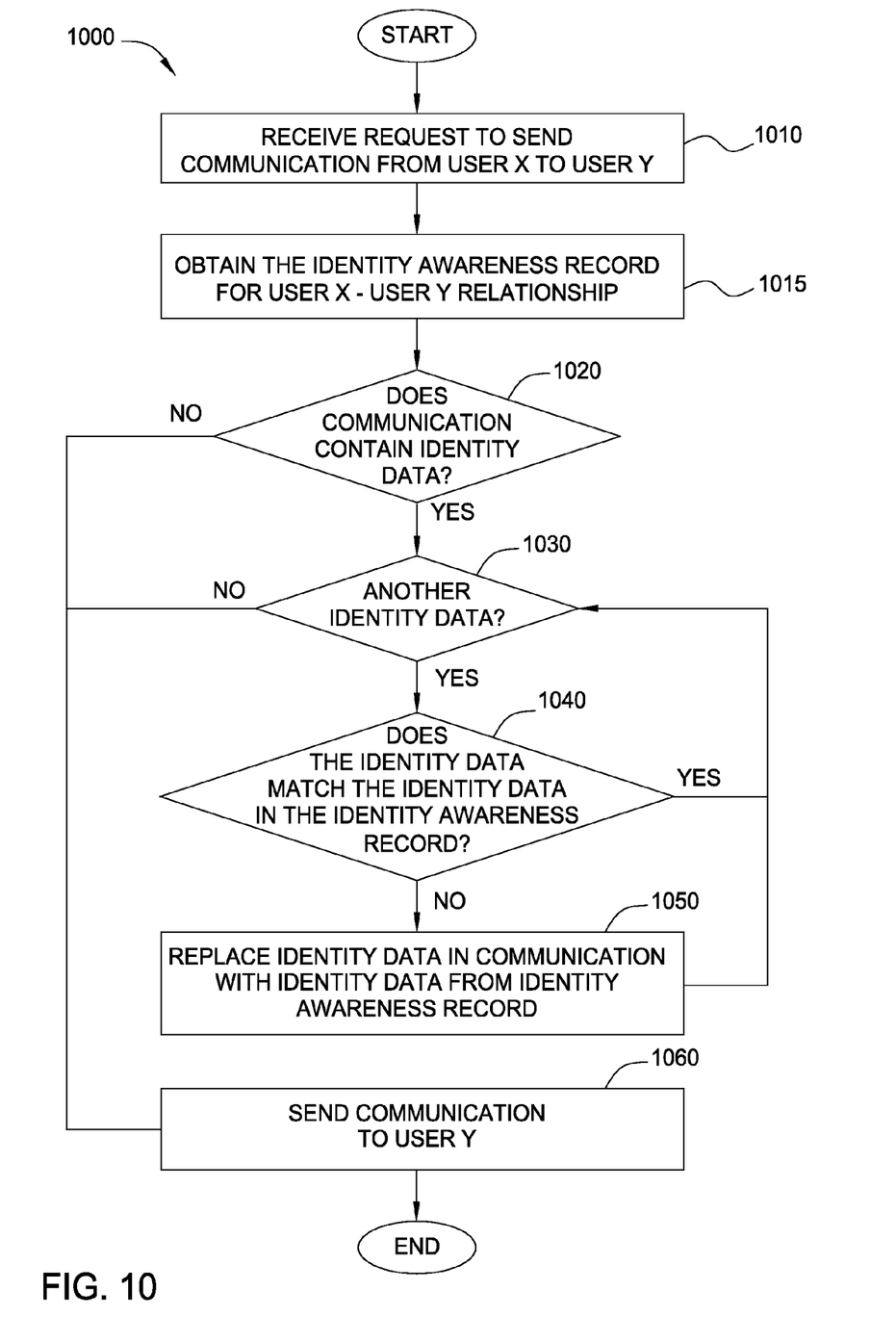
FIG. 10 is a flow diagram illustrating a method for displaying an alias for personal identity data, according to one embodiment of the invention.

FIG. 10 is a flow diagram illustrating a method for displaying an alias for identity data, according to one embodiment of the invention. As shown, the method 1000 begins at step 1010, where the client application 109 receives a request from User X to send text or other communication data to User Y. At step 1015, the client application 109 obtains the identity awareness record for User X that stores the User X identity data that User Y is aware of. At step 1020, the client application 109 determines whether the communication data contains identity data (for example, a first or last name). If not, the method 1000 proceeds to step 1060, where the communication data is delivered to User Y. However, if the communication data contains identity data, then the method 1000 proceeds to step 1030, where a loop consisting of steps 1030-1050 begins, in which identity data is evaluated.

At step 1030, the client application 109 determines whether more identity data remains to be evaluated. If so, then at step 1040, the client application 109 determines whether the identity data in the communication matches the identity data in the identity awareness record. In other words, the client application 109 determines if User Y is aware of the true identity data for User X. For example, if John uses his real first name ("John") in the communication, then the client application 109 will determine if the identity awareness record has the value, "John," stored for the first name. If so, then the method 1000 returns to step 1030.

However, if the identity data in the communication does not match the identity data in the identity awareness record, then at step 1050, the identity data in the communication is replaced with the identity data from the identity awareness record. In other words, the identity data in the communication is substituted with an alias. For example, if the first name of User X is "Brian," but the identity awareness record of painter_dude for suzie_q has the value, "Neo," stored for the first name, then the name, "Brian," is replaced with the name, "Neo" for all communication seen by suzie_q. In one embodiment, if there is no value stored in the identity awareness record that corresponds to the identity data in the communication (for example, no value for "first name"), then the client application 109 uses a default alias value. In another embodiment, the identity data in the communication is stored into the identity awareness record, as in method 700. The method 1000 then returns to step 1030. At step 1030, if there is no more identity data to evaluate, the method 1000 proceeds to step 1060. At step 1060, the client application 109 sends the communication to User Y.

Advantageously, as described above, embodiments of the present invention allow users of virtual worlds and social networking applications to control what personal identity data other users have access to and to determine what identity data that users learn about one another. Generally, identity awareness records may be used to store the personal identity data that a user has revealed to other users. In one embodiment, when the user sends information to another user, personal identity data is mapped to appropriate aliases, depending upon which user is receiving the information. In further embodiments, when the user is in the presence of other users, a visual dashboard indicates the types of personal identity information that the user knows about each other user, as well as the types of personal identity information that each other user knows about the user. The visual dashboard may also indicate the types of personal identity information that the other users know about each other.

While the foregoing is directed to embodiments of the present invention, other and further embodiments of the invention may be devised without departing from the basic scope thereof, and the scope thereof is determined by the claims that follow.

What is claimed is:

1. A computer-implemented method for presenting identity data to users interacting with one another in a virtual environment, comprising:
   storing personal identity information associated with a first user, a second user, and a third user, respectively, the personal identity information comprising for each user, a plurality of personal identity information elements;
   monitoring communications between the first user, the second user, and the third user to determine what personal identity information is revealed between the first user, the second user, and the third user based on communications therebetween;
   determining that the first user has initiated a communication to the second user accessible by the third user, wherein the communication is determined to be accessible by the third user based on a determination that the third user is in the presence of the first user in the virtual environment, and that the communication discloses a personal identity information element of the plurality of personal identity information elements associated with the second user;
   if the personal identity information element has not been previously revealed to the third user by the second user, programmatically replacing, by operation of one or more computer processors, the personal identity information element with an alias associated with the personal identity information element and outputting the alias, to prevent the first user from disclosing the personal identity information element to the third user, and if the personal identity information element has been previously revealed to the third user by the second user, outputting the personal identity information element to the third user without programmatically replacing the personal identity information element with an alias associated with the second information element;
   determining, based on the monitored communications between the users, which personal identity information elements associated with the first and second users have been previously revealed between the first and second users and which personal identity information elements associated with the first and third users have been previously revealed between the first and third users; and
   presenting, to the first user, a visual display of said determined previously revealed personal identity information elements in response to a request from the first user.

2. The method of claim 1, wherein the visual display further includes a display of element types from the personal identity information elements associated with the second user, that the first user does not know about the second user.

3. The method of claim 2, wherein the visual display further includes a display of element types from the personal identity information elements associated with the first user, that the second user does not know about the first user.

4. The method of claim 3, wherein the communication comprises a text-based chat message.

5. The method of claim 4, further comprising:
   determining personal identity information elements associated with the third user, that have been previously revealed to the first user and the second user by the third user;
   wherein the visual display further includes a display of the determined personal identity information elements associated with the third user.

6. The method of claim 5, wherein the personal identity information includes a name of the first or second user.

7. The method of claim 6, wherein the personal identity information further includes contact information associated with the first or second user.

8. A non-transitory computer-readable medium containing a program which, when executed, performs an operation for presenting identity data to a first user, comprising:
   storing personal identity information associated with a first user, a second user, and a third user, respectively, the personal identity information comprising, for each user, a plurality of personal identity information elements;
   monitoring communications between the first user, the second user, and the third user to determine what personal identity information is revealed between the first user, the second user, and the third user based on communications therebetween;
   determining that the first user has initiated a communication to the second user accessible by the third user, wherein the communication is determined to be accessible by the third user based on a determination that the third user is in the presence of the first user in the virtual environment, and that the communication discloses a personal identity information element of the plurality of personal identity information elements associated with the second user;
   if the personal identity information element has not been previously revealed to the third user by the second user, programmatically replacing, by operation of one or more computer processors when executing the program, the personal identity information element with an alias associated with the personal identity information element and outputting the alias, to prevent the first user from disclosing the personal identity information element to the third user, and if the personal identity information element has been previously revealed to the third user by the second user, outputting the personal identity information element to the third user without programmatically replacing the personal identity information element with an alias associated with the second information element;
   determining, based on the monitored communications between the users, which personal identity information elements associated with the first and second users have been previously revealed between the first and second users and which personal identity information elements associated with the first and third users have been previously revealed between the first and third users; and
   presenting, to the first user, a visual display of said determined previously revealed personal identity information elements in response to a request from the first user.

9. The non-transitory computer-readable medium of claim 8, wherein the visual display further includes a display of element types from the personal identity information elements associated with the second user, that the first user does not know about the second user.

10. The non-transitory computer-readable medium of claim 9, wherein the visual display further includes a display of element types from the personal identity information elements associated with the first user, that the second user does not know about the first user.

11. The non-transitory computer-readable medium of claim 10, wherein the communication comprises a text-based chat message.

12. The non-transitory computer-readable medium of claim 11, wherein the operation further comprises:
    determining personal identity information elements associated with the third user, that have been previously revealed to the first user and the second user by the third user;
    wherein the visual display further includes a display of the determined personal identity information elements associated with the third user.

13. The non-transitory computer-readable storage medium of claim 12, wherein the personal identity information includes a name of the first or second user.

14. The non-transitory computer-readable storage medium of claim 13, wherein the personal identity information further includes contact information associated with the first or second user.

15. A system, comprising:
    a processor; and
    a memory containing a program, which, when executed by the processor, performs an operation for presenting identity data to users interacting with one another in a virtual environment, the operation comprising:
    storing personal identity information associated with a first user, a second user, and a third user, respectively, the personal identity information comprising, for each user, a plurality of personal identity information elements;
    monitoring communications between the first user, the second user, and the third user to determine what personal identity information is revealed between the first user, the second user, and the third user based on communications therebetween;
    determining that the first user has initiated a communication to the second user accessible by the third user, wherein the communication is determined to be accessible by the third user based on a determination that the third user is in the presence of the first user in the virtual environment, and that the communication discloses a personal identity information element of the plurality of personal identity information elements associated with the second user;
    if the personal identity information element has not been previously revealed to the third user by the second user, programmatically replacing the personal identity information element with an alias associated with the personal identity information element and outputting the alias, to prevent the first user from disclosing the personal identity information element to the third user, and if the personal identity information element has been previously revealed to the third user by the second user, outputting the personal identity information element to the third user without programmatically replacing the personal identity information element with an alias associated with the second information element;
    determining, based on the monitored communications between the users, which personal identity information elements associated with the first and second users have been previously revealed between the first and second users and which personal identity information elements associated with the first and third users have been previously revealed between the first and third users; and
    presenting, to the first user, a visual display of said determined previously revealed personal identity information elements in response to a request from the first user.

16. The system of claim 15, wherein the visual display further includes a display of element types from the personal identity information elements associated with the second user, that the first user does not know about the second user.

17. The system of claim 16, wherein the visual display further includes a display of element types from the personal identity information elements associated with the first user, that the second user does not know about the first user.

18. The system of claim 17, wherein the communication comprises a text-based chat message.

19. The system of claim 18, wherein the operation further comprises:
    determining personal identity information elements associated with the third user, that have been previously revealed to the first user and the second user by the third user;
    wherein the visual display further includes a display of the determined personal identity information elements associated with the third user.

20. The system of claim 19, wherein the personal identity information includes a name of the first or second user.

21. The system of claim 20, wherein the personal identity information further includes contact information associated with the first or second user.

22. The system of claim 21, wherein each personal identity information element in the plurality of personal identity information elements associated with each user is accessible by other users via communications from the respective user, and wherein the visual display is presented to the first user to indicate, to the first user, which personal identity information elements the second user and third user have previously revealed to each other, to guide the first user in interactions with the second user and the third user.

23. The system of claim 22, wherein the operation further comprises:
    upon determining that the first user has initiated a second communication accessible by a third user, the second communication disclosing a second personal identity information element associated with the second user, wherein the second personal identity information element has been previously revealed to the third user by the second user, outputting the second personal identity information element to the third user without programmatically replacing the second personal identity information element with any alias associated with the second personal identity information element.

24. The system of claim 23, wherein the visual display of the determined personal identity information elements further includes the alias, and wherein the visual display is presented to the first user to further indicate, to the first user, which personal identity information elements are programmatically replaced, wherein the virtual environment is provided by a virtual world application, wherein the virtual world application is configured to:
    store the personal identity information in the form of one or more identity data records storing a plurality of identity fields; and log revealed personal identity information in the form of one or more identity awareness records different from the one or more identity data records, wherein one or more identity awareness records store a plurality of awareness flags corresponding to the plurality of identity fields, each awareness flag indicating whether the corresponding identity field has been revealed to a specified user;

and wherein the operation further comprises:

generating an alert upon determining that the first user has not previously disclosed a predetermined personal identity information element to at least one of the second user and the third user, wherein the alert is output for display to the first user.

* * * * *